(12) United States Patent
DeMaio (10) Patent No.: US 11,259,110 B2
(45) Date of Patent: Feb. 22, 2022

(54) CHARGING CASE FOR EARBUDS AND INTERCHANGEABLE, RECHARGEABLE BATTERIES

(71) Applicant: Robert Charles DeMaio, Incline Village, NV (US)

(72) Inventor: Robert Charles DeMaio, Incline Village, NV (US)

( * ) Notice: Subject to any disclaimer, the term of this patent is extended or adjusted under 35 U.S.C. 154(b) by 0 days.

(21) Appl. No.: 17/305,947

(22) Filed: Jul. 17, 2021

(65) Prior Publication Data

US 2021/0345031 A1 Nov. 4, 2021

Related U.S. Application Data

(63) Continuation-in-part of application No. 17/305,474, filed on Jul. 8, 2021.

(51) Int. Cl.
| | |
|---|---|
| *H04R 1/10* | (2006.01) |
| *H02J 7/00* | (2006.01) |
| *H04R 1/02* | (2006.01) |
| *H02J 7/34* | (2006.01) |

(52) U.S. Cl.
CPC .......... *H04R 1/1025* (2013.01); *H02J 7/0044* (2013.01); *H02J 7/0047* (2013.01); *H04R 1/02* (2013.01); *H04R 1/1016* (2013.01); *H04R 1/1058* (2013.01); *H02J 7/342* (2020.01); *H04R 2420/07* (2013.01)

(58) Field of Classification Search
CPC ...... H04R 1/1025; H04R 1/02; H04R 1/1016; H04R 1/1058; H04R 2420/07; H02J 7/0044; H02J 7/0047; H02J 7/342
USPC .................................. 320/103, 114; 381/74
See application file for complete search history.

(56) References Cited

U.S. PATENT DOCUMENTS

2017/0094399 A1* 3/2017 Chandramohan .... H04B 5/0037
2020/0266640 A1* 8/2020 Valenzuela ........... H02J 7/0044

* cited by examiner

*Primary Examiner* — Zixuan Zhou
(74) *Attorney, Agent, or Firm* — Tatonetti IP

(57) ABSTRACT

A charging case is configured with two sides that can store a pair of earbuds on one side and a pair of batteries on the other side; the batteries are connectable and interchangeable with the earbuds. Underneath a top lid is two earbud homes which correspond to the size and shape of the earbuds. The homes include an upper portion to hold the main body of the earbuds and an opening that receives the ear tip of the earbuds. Underneath the charging case's bottom lid are battery homes that can store and charge the earbud's detachable and rechargeable batteries. Each earbud and battery home includes charging points that engage with corresponding charging points on the earbuds and batteries, respectively. Charging lights that extend around a horizontal perimeter of the charging case are utilized to notify the user of input earbuds or batteries' charging status.

20 Claims, 13 Drawing Sheets

CHARGING CASE FOR EARBUDS AND INTERCHANGEABLE, RECHARGEABLE BATTERIES

CROSS-REFERENCES TO RELATED APPLICATIONS

This Non-Provisional Utility Patent Application is a Continuation-In-Part (CIP) application of U.S. patent application Ser. No. 17/305,474, filed Jul. 8, 2021, entitled "Interchangeable and Rechargeable Batteries for Earbuds," the entire contents of which is hereby incorporated herein by reference. This Non-Provisional Utility Patent Application is related to U.S. Design patent application Ser. No. 29/788,690, filed contemporaneously herewith on Jul. 17, 2021, entitled "Charging Case for Earbuds and Rechargeable, Interchangeable Batteries," the entire contents of which is hereby incorporated herein by reference.

BACKGROUND

Earbud cases are typically configured with slots into which earbuds are inserted. The earbud cases tend to be plain, generic, and lacking in modern and valuable functionality and features.

SUMMARY

A charging case is configured with two sides that can store a pair of earbuds on one side and a pair of batteries on the other side; the batteries are connectable and interchangeable with the earbuds. Underneath a top lid is two earbud homes which correspond to the size and shape of the earbuds. Each earbud home includes charging points that engage with corresponding charging points on the earbuds. The homes include an upper portion to hold the main body of the earbuds and an opening that receives the ear tip of the earbuds. The top lid's inside surface may be recessed to accommodate the body of the earbuds when inserted into the homes.

Underneath a bottom lid is two battery homes that can store and charge batteries that are detachable from the earbud's main body. Thus, the user can charge a second pair of batteries in the charging case while using the first set of batteries attached to and powering the earbuds. Once the battery life of the first pair of batteries is depleted, the user can detach the batteries, remove the second pair of batteries from the charging case, and attach them to the earbuds. The user can insert the depleted first pair of batteries into the charging case for charging while using the second pair. Therefore, the user can virtually endlessly listen to music without ever being forced to place the earbuds into any long-term submission for charging. Instead, the user can easily swap out the pairs of batteries and continue with the entertainment.

The charging case may have its own internal rechargeable battery that can charge input components, namely the earbuds and batteries. Furthermore, the charging case comes with a port, such as a universal serial bus (USB) (e.g., micro-USB, macro-USB, mini-USB, etc.), to receive power from an outlet or computing device (e.g., personal or laptop computer). The case may charge its own internal battery or direct the electrical current to the input components before charging its own battery.

Charging status lights extend horizontally around an entire perimeter of the charging case's surface, that is, from the front to the rear of the case. Two charging lights are present: one for the earbuds home and one for the batteries home. The charging lights are positioned adjacently to the top lid and the bottom lid. The charging status lights change color based on a detected charge of the earbuds or batteries. For example, the charging lights may display red, yellow, or green depending on charging status. Red signifies low battery, yellow signifies moderate battery life, and green signifies fully or almost fully charged.

Furthermore, the charging lights may be broken into four sections, one for each input component. Thus, a top-left charging status light may reflect the top left earbud's remaining battery life, and the top right charging status light may indicate the top right earbud's remaining battery life. Likewise, the bottom left charging status light may reflect the bottom left battery's remaining life, and the bottom right charging status light may reflect the bottom right battery's life.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. It will be appreciated that the above-described subject matter may be implemented as a computer-controlled apparatus, a computer process, a computing system, or as an article of manufacture such as one or more computer-readable storage media. These and various other features will be apparent from a reading of the following Detailed Description and a review of the associated drawings.

DESCRIPTION OF THE DRAWINGS

Like reference numerals indicate like elements in the drawings. Elements are not drawn to scale unless otherwise indicated.

DETAILED DESCRIPTION

Figure 1:
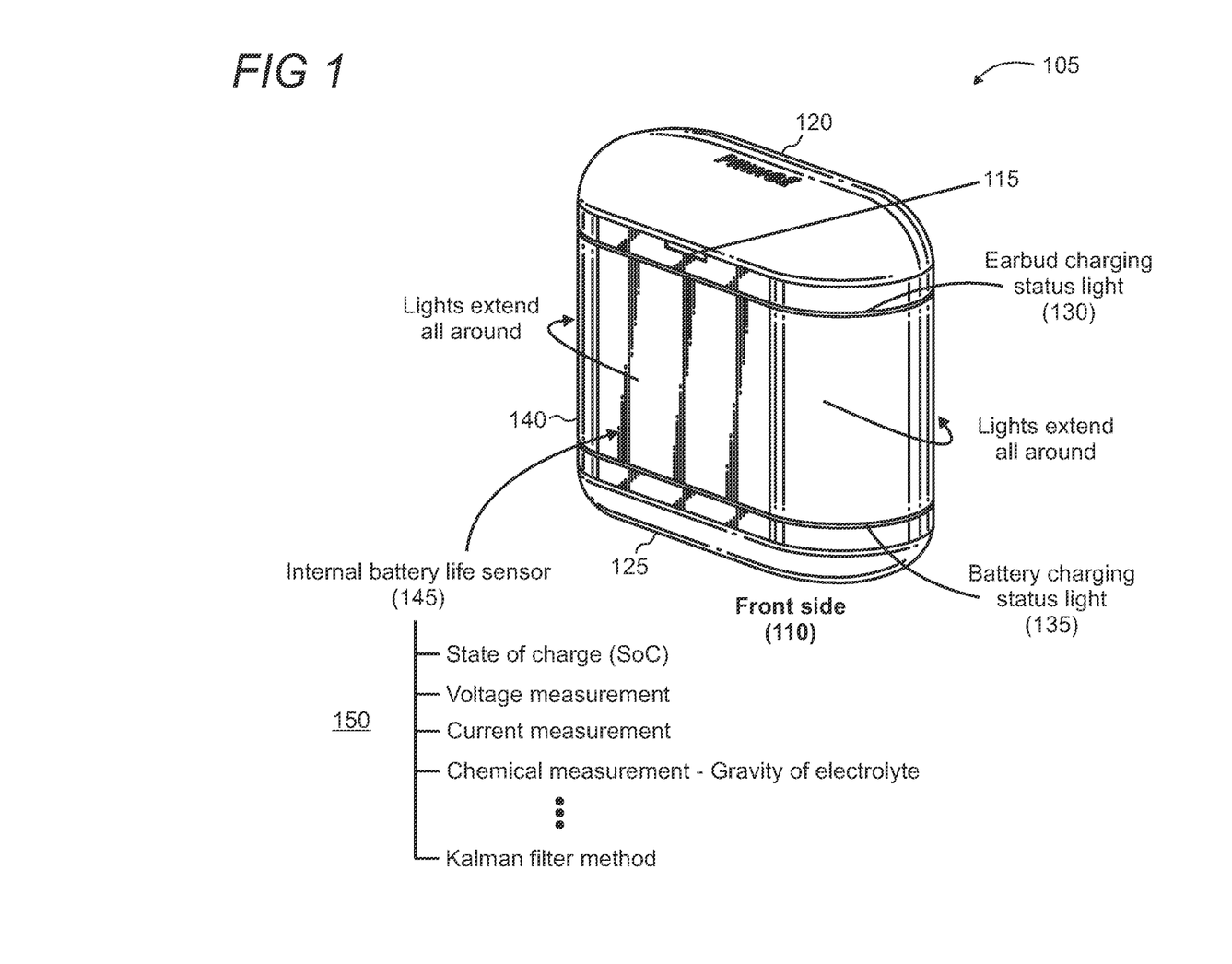
FIG. 1 shows an illustrative representation of a charging case in a closed position.

FIG. 1 shows an illustrative representation in which a charging case 105 includes a top lid 120 and a bottom lid 125 attached to a central body 140. The top and bottom lids cover receptacles into which components can be inserted for charging, namely, earbuds and removable earbud batteries (not shown in FIG. 1). The front side 110 of the case includes a cut-out 115 for the user to easily insert their finger or nail to lift the top lid. The charging case includes earbud charging status lights 130, 135 located on the case's upper and lower exterior portions. The charging status lights extend around an entire exterior perimeter of the case so that the charging status is viewable from multiple diverse angles. That is, the user can identify the internal components (e.g., earbuds or removable batteries) charging status by a glance from virtually any angle of the case.

The earbud case includes an internal battery life sensor 145, which detects a battery life of one or both of an input earbud or removable battery. The battery life sensor is operably within communication with the earbuds and batteries, when inserted into the case as discussed in greater detail below, to detect a battery life for each. For example, the battery life sensor may use various methods to determine the battery life, such as using a state of charge (SoC) measurement, voltage measurement, current measurement, chemical measurement by measuring the gravity of the batteries' electrolytes, or the Kalman filter method, as representatively shown by schema 150. The measurements may be performed by a discrete sensor which transmits the data to a microcontroller or processor for assessment. The processor, responsive to receiving the data for each battery, controls and adjusts the charging status lights 130, 135. The measurements and sensing may be performed, for example, by placing the sensor within operable communication to a wire that connects to one of the earbud's or removable battery's charging points.

Figure 2:
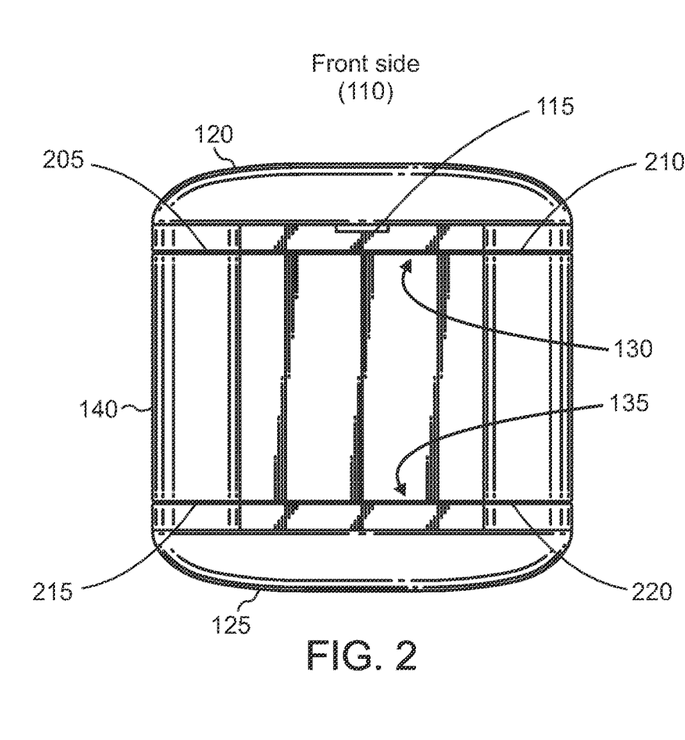
FIGS. 2 and 3 show illustrative representations of the charging case's front and rear sides.
Figure 3:
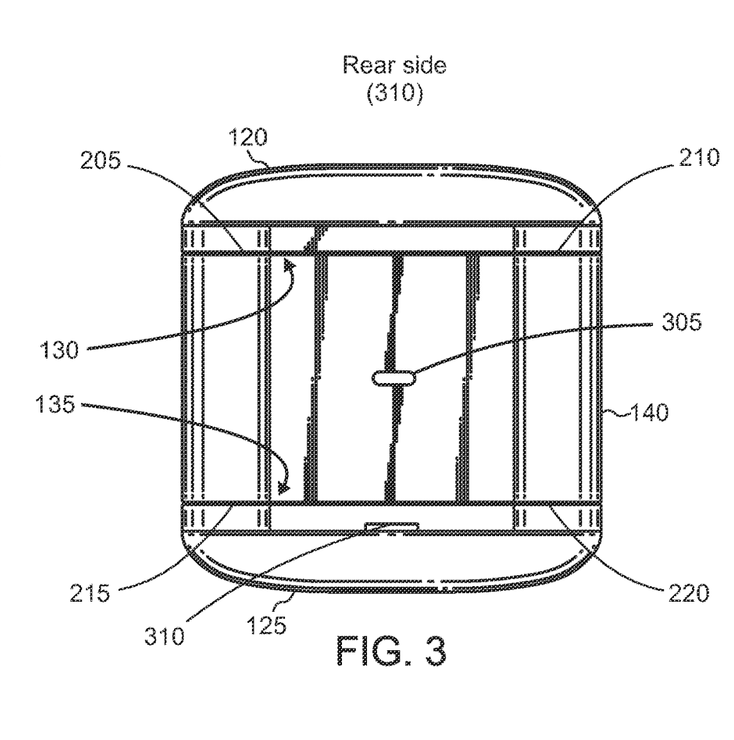

FIGS. 2 and 3 show illustrative representations of the charging case's front side 110 and rear side 310. The upper and lower charging status lights 130, 135 are further broken down by sections that correspond to a specific component inside the charging case 105. For example, upper left section 205 and upper right section 210 respectively indicate the charging status of the earbuds in the upper left home and the upper right home, which are not shown in FIGS. 1-3 but are shown and discussed in greater detail below. Likewise, the bottom left section 215 and bottom right section 220 respectively indicate the charging status of the removable batteries for the earbuds in the bottom left and bottom right battery homes, likewise shown and discussed in greater detail below.

The charging status lights may shine in various colors depending on the specific charging status. In typical implementations, the lights may shine red, yellow, and green. The charging lights may shine red when the battery life of the earbud or removable battery is below a preset threshold, such as 20% or below. The charging lights may shine yellow when the battery life is within some preset threshold limits, such as between 21% and 80%. Finally, the charging lights may shine green when the battery life is above some preset threshold, such as above 81%.

The charging status lights 130, 135 may be LEDs (Light Emitting Diodes) that are either directed explicitly to the colors red, green, or yellow or may be a multi-color strip capable of dynamically adjusting the color. For example, by combining red, blue, and green LEDs with a microcontroller or processor, the color-changing can create a full range of colors. In this regard, the charging status lights may shine red, yellow, and green and in-between mixed colors that show a subset of the battery life's status. For example, the green may range from a dull green to light green depending on whether the battery is near 80% charge or near 100% charge, respectively. This dulling and brightening of the colors may likewise work for the mid-range charge (yellow) and low charge (red). Other colors (e.g., purple, orange, etc.) may also be used to indicate a specific charge.

The charging status lights 130, 135 may extend around an entire exterior perimeter of the charging case 105. Sections 205, 210, 215, 220 may be separated at the center of the charging case's front and rear sides 110, 310. This way, a charged component is given an equally-sized status light. As shown in the drawings, the charging status lights are unbroken around the central body's perimeter, such that the lights extend from end to end. While a charging status light may be a single light strip, alternatively, two separate light strips may be utilized for the upper and lower lights, in which each distinct strip is dedicated to a specific earbud or battery home, such as one for each section.

The charging case's rear side 310 also includes a port 305, such as a universal serial bus (USB) (e.g., micro-USB, macro-USB, mini-USB, etc.), to receive power from an outlet or computing device (e.g., personal or laptop computer). The case may charge its own internal battery or direct the electrical current to the input components before charging its own battery.

Alternatively or additionally to the port 305, one or both of the front or rear sides 110, 310 may be configured with wireless charging technology to enable electrical current to flow from a wireless charger to the case 105. In typical implementations, a wireless charging device may transfer energy to a receiver on the charging case via electromagnetic induction. The wireless charging device generates an alternating electromagnetic field which the receiver on the charging case converts back into electricity form for charging its internal battery and/or connected earbuds or earbud batteries.

Figure 4:
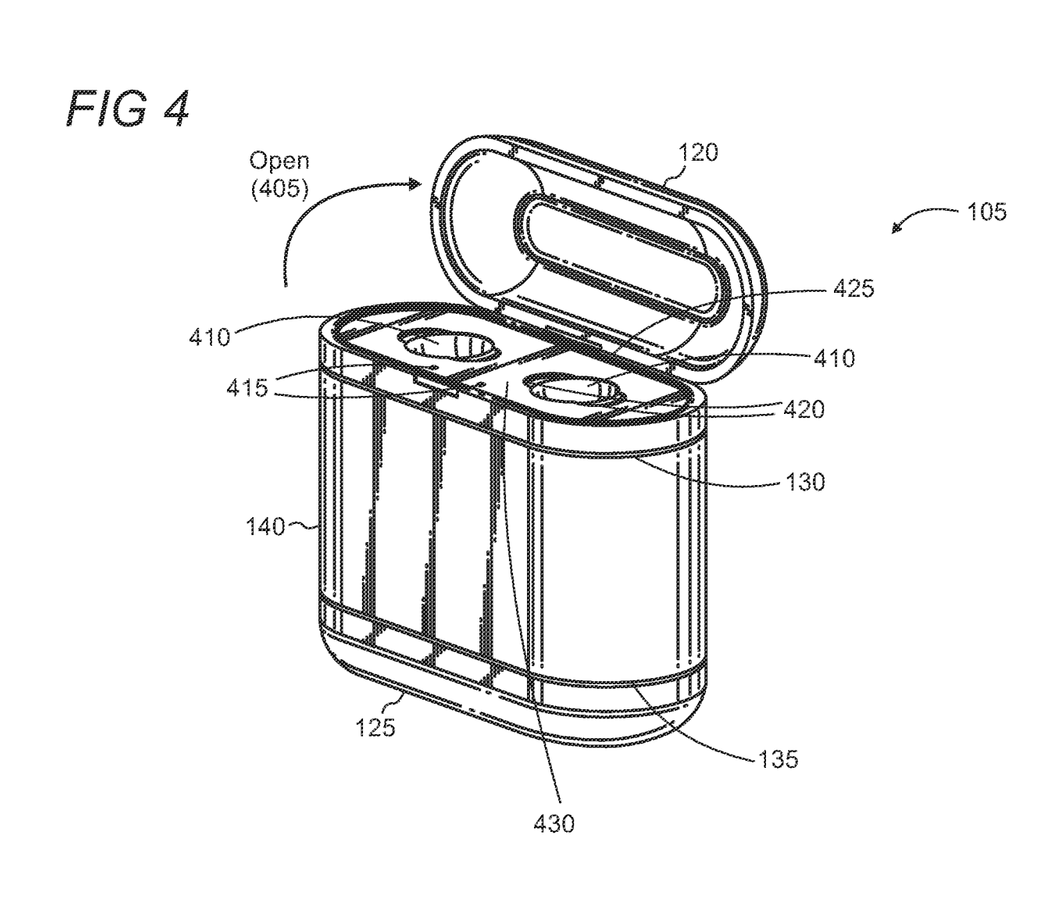
FIG. 4 shows an illustrative representation of the top lid propped open.

FIG. 4 shows an illustrative representation in which the charging case's top lid 120 is propped open 405 about hinge 425 while the bottom lid 125 is still closed. Underneath the top lid is a flat surface 430, which includes a left earbud home 410 and a right earbud home 410, which respectively receive a left and right earbud. The earbud homes may be, at least in part, underneath the surface 430. The inside of the charging case includes indicator lights 415, indicating whether the earbuds are correctly inserted and therefore receive a charge from the charging case 105. Each earbud home also includes recesses 420 in the top surface so the user can easily remove the inserted earbuds. The same reference numerals are used for the left and right earbuds for clarity in exposition and explanation and indicate the case's symmetrical structure, at least concerning what is underneath the lids.

Figure 5:
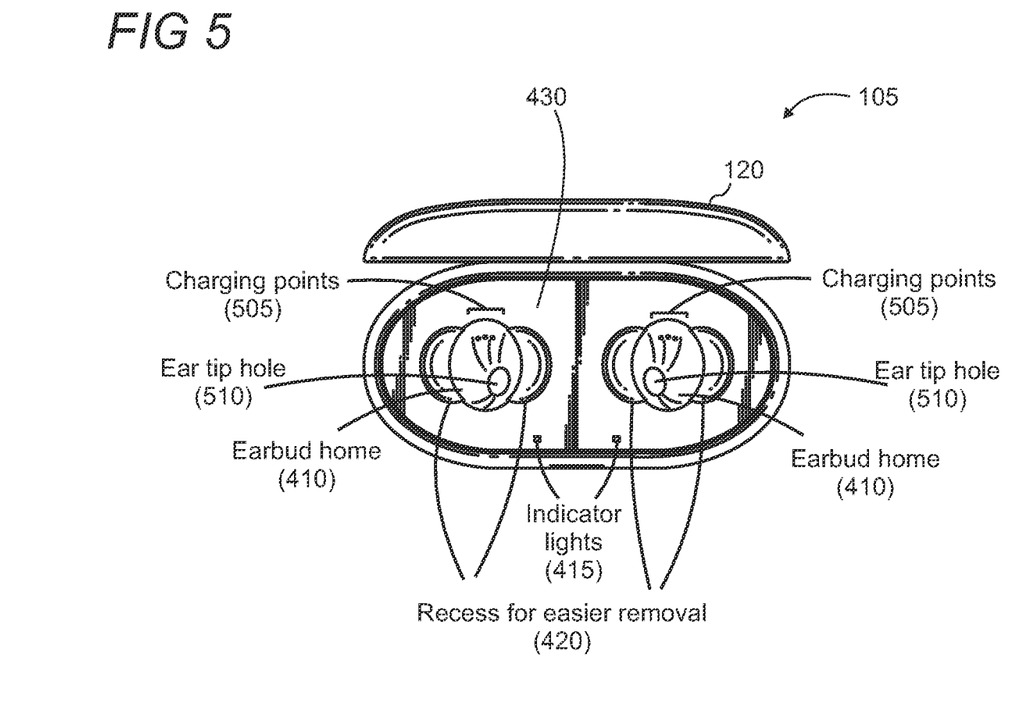
FIG. 5 shows an illustrative representation of the case's earbud homes underneath the top lid.

FIG. 5 shows an illustrative representation in which the earbud homes 410 include ear tip holes 510 and charging points 505. In this exemplary embodiment, a set of three charging points are shown, in which corresponding charging points on the earbuds (not shown in FIG. 5) engage with the case's charging points so that the charging case 105 can pass a charge to the earbuds. The charging points on the case and earbuds may comprise a metal, including copper, brass, or gold. The case may pass an electrical current to the earbuds. The earbuds may relay the charge to its removable battery, as discussed in greater detail below, or the earbud may have an internal battery within its main body the case can charge. The main body may pass the charge to an attached removable battery so that the case can charge either one or both (if present) of the earbud's internal battery and the removable battery.

Other configurations of charging points can also be implemented, such as a pair of two charging points, a strip, a port (e.g., universal serial bus (USB)), etc. For example, the case may include a male connector, and the earbuds may have a female connector that connects to the case's male connector. In this regard, the earbuds' female connectors may have a liftable cover to protect the port from debris and liquids when in use. In this regard, the term "charging point" (singular) may characterize various forms and types of charging mechanisms and designs.

When the left and right earbuds are inserted into the respective earbud homes 410, the indicator lights 415 (e.g., LEDs) may shine a color to indicate a proper connection between the earbuds and charging contacts. For example, the indicator lights may shine white when a connection is established and switched off when not connected. The indicator lights may shine red if a problem is detected, such as water or other liquid or debris causing interference between the charging points. The user can stick their finger or nail at the recesses 420 to easily lift the earbuds away for use.

The earbud homes 410 may also include a magnet that attracts to another magnet on the earbuds. For example, a magnet may be positioned after the earbud tips and attract to a magnet within a corresponding spot, such as within the ear tip holes 510. Using the magnet may make inserting and securing the earbuds in place easier.

Figure 6:
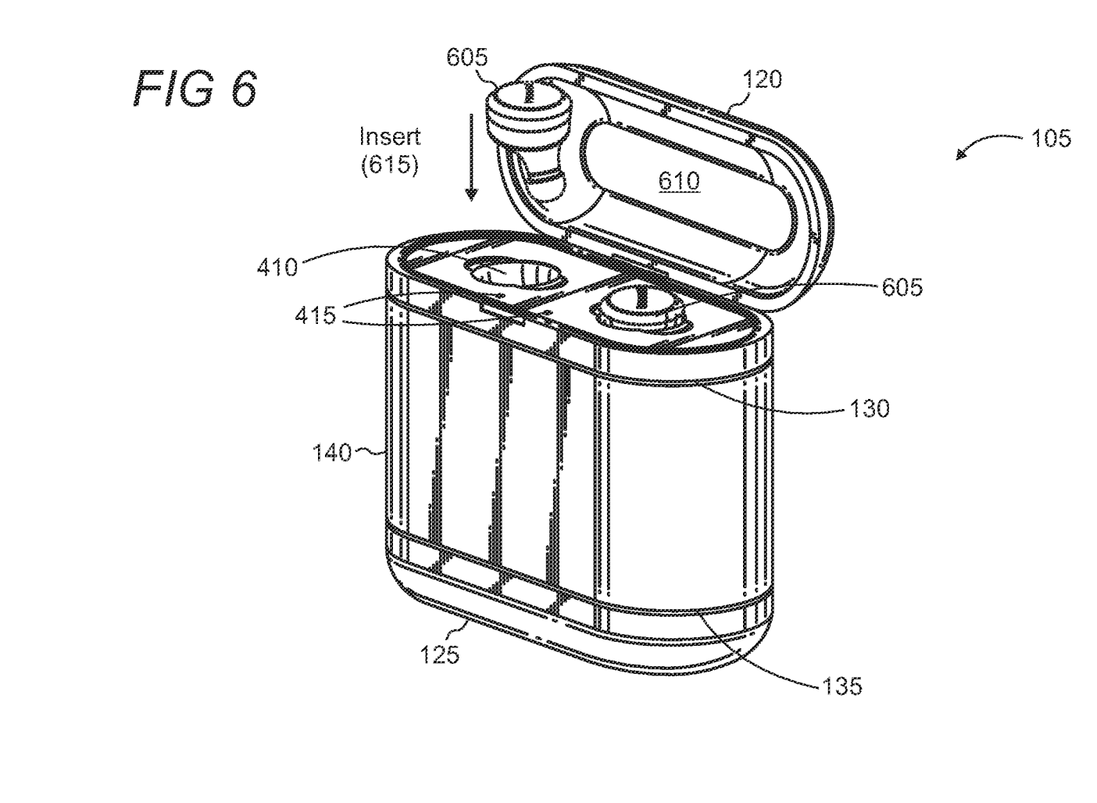
FIG. 6 shows an illustrative representation in which earbuds are inserted into the case's earbud homes.

FIG. 6 shows an illustrative representation in which earbuds 605 are inserted into the earbud homes 410, as representatively shown by numeral 615. The inner surface of the top lid includes a recess to accommodate any space that the earbuds may occupy. The earbud tips are inserted downward into the ear tip holes 510, so the earbud's bodies can rest inside the earbud homes. The top lid 120 can then be shut while the earbuds charge via the charging points 505.

Figure 7:
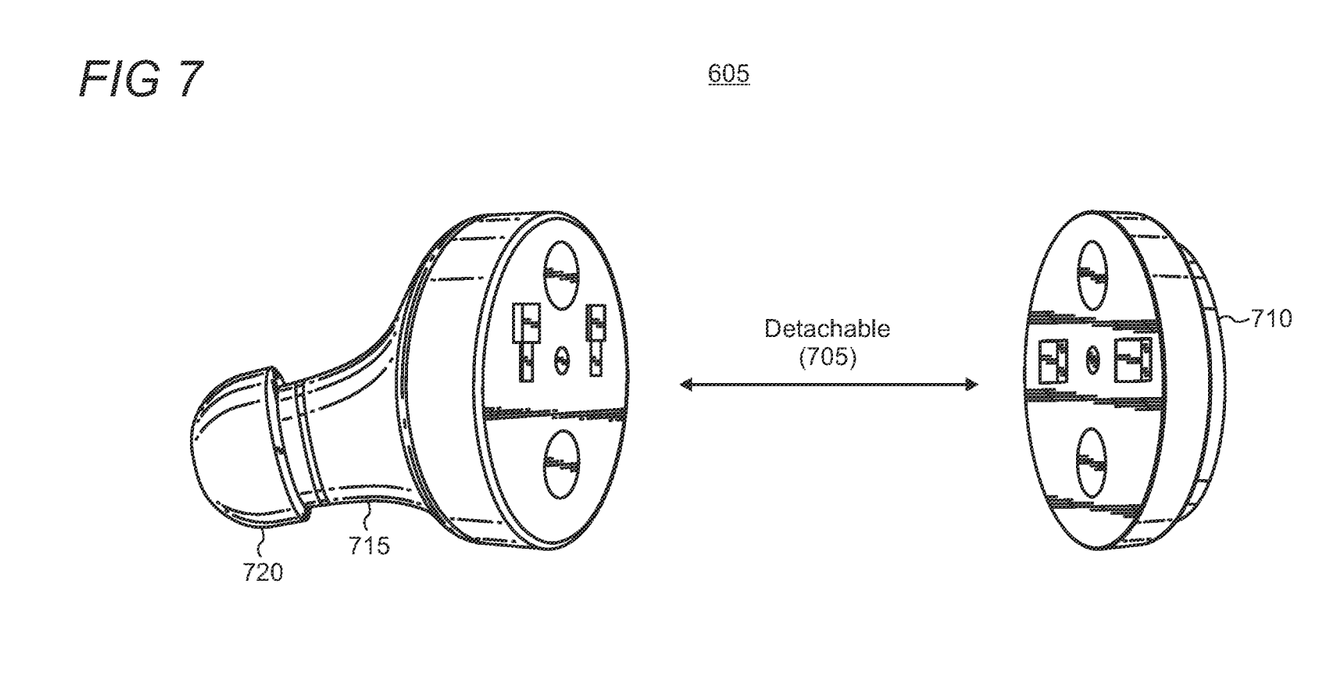
FIG. 7 shows an illustrative representation of an earbud having a removable battery.
Figure 8:
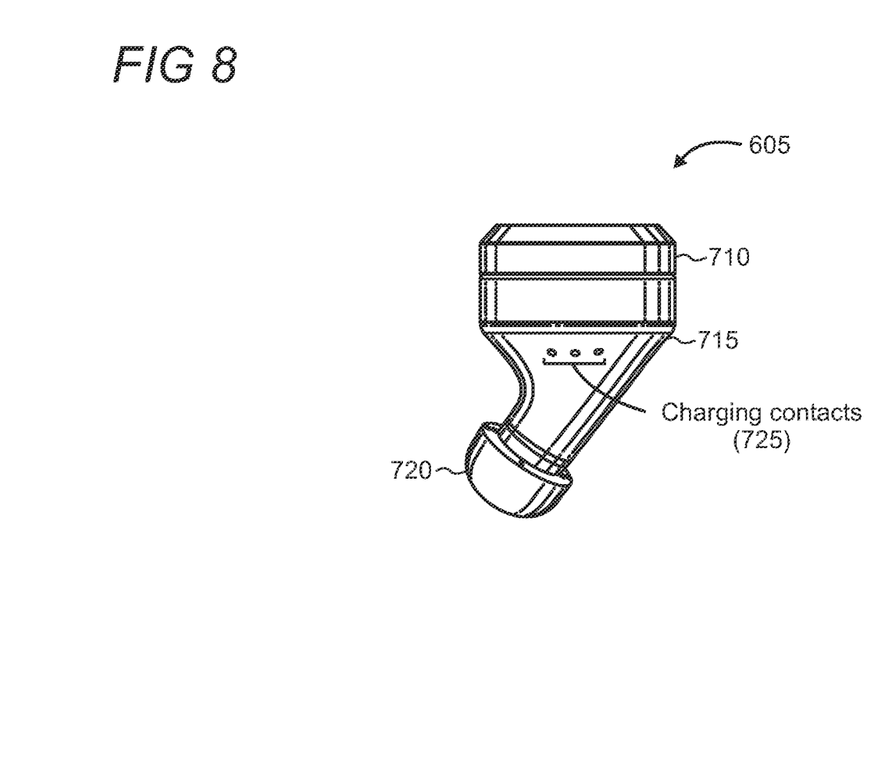
FIG. 8 shows an illustrative representation of the earbud's charging points.

FIGS. 7 and 8 show illustrative representation in which the earbud 605 includes a main body 715, ear tip 720, typically comprised of silicone material, and the removable battery 710. The battery is detachable from the earbud's main body, as representatively shown by numeral 705. The interoperation and configuration of the main body and the removable battery can be viewed in corresponding U.S. patent application Ser. No. 17/305,474, filed Jul. 8, 2021, entitled "Interchangeable and Rechargeable Batteries for Earbuds," the entire contents of which is hereby incorporated herein by reference. In FIG. 8, the charging points 725 can engage with the corresponding charging points 505 within the earbuds charging case (FIG. 5). The main body may pass a received electrical current from the charging points to the removable battery 710. Additionally, the main body may house an internal battery that the charging case can charge. Therefore, the charging connection can charge one or both (if present) of the main body's internal battery and the removable battery.

Figure 9:
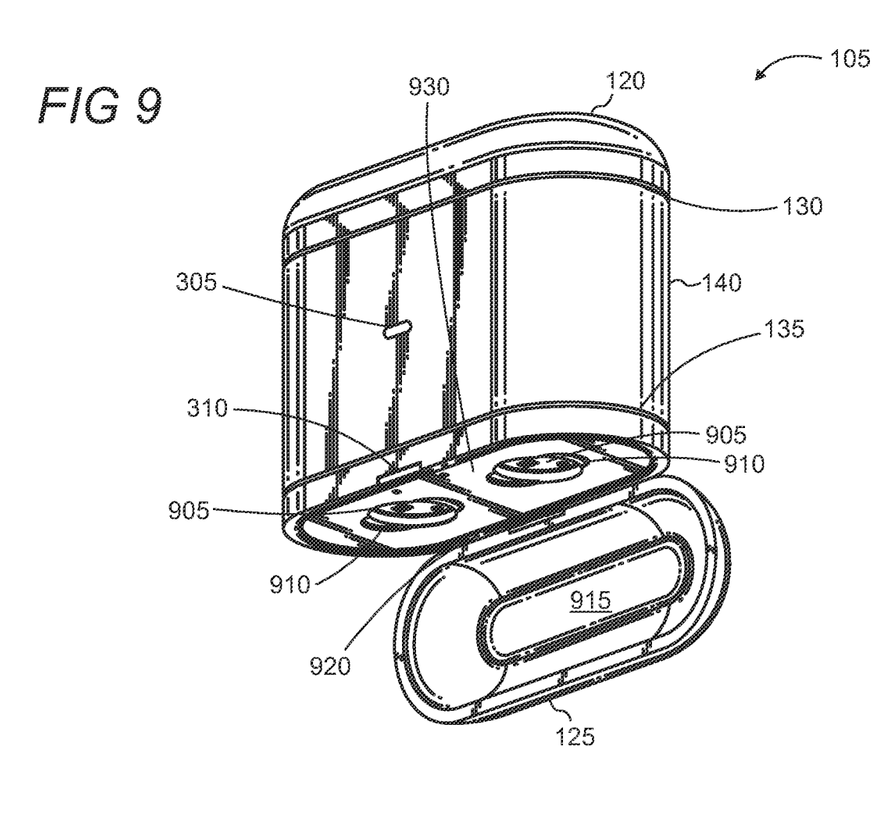
FIG. 9 shows an illustrative representation of the charging case's bottom lid propped open.
Figure 10:
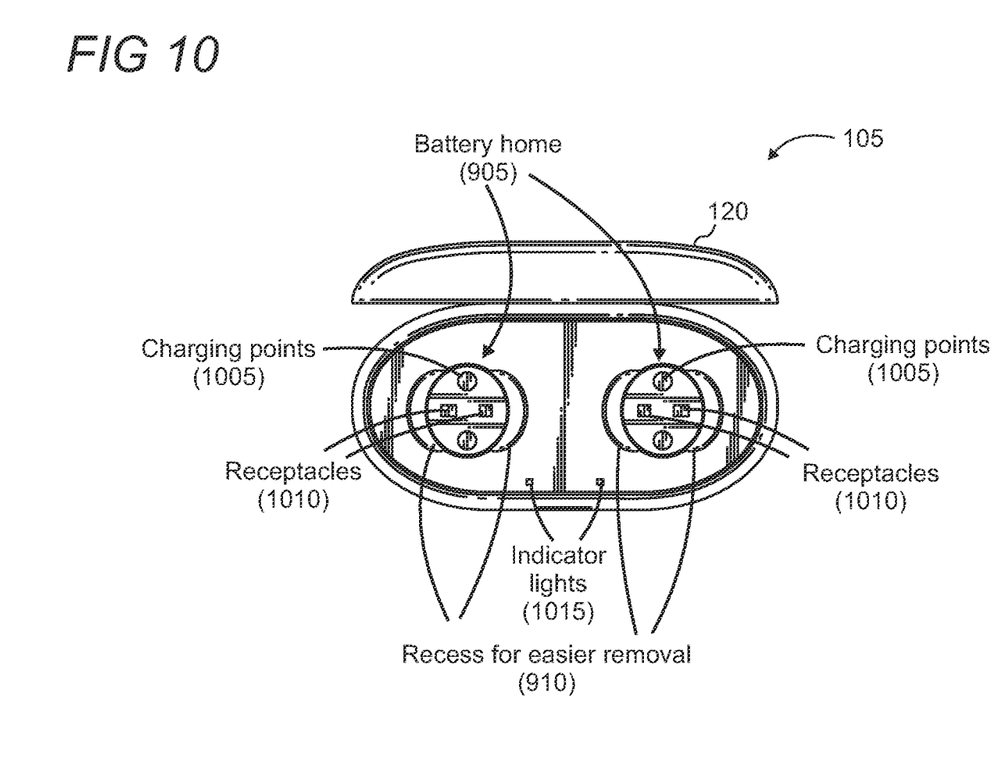
FIG. 10 shows an illustrative representation of the case's battery homes underneath the top lid.

FIGS. 9 and 10 show illustrative representations in which the bottom lid 125 is propped open about hinge 920, and the top lid 120 is closed. The lids are independently operable, so each one can be propped open at the same time as well. Underneath the bottom lid is a flat surface 930, which includes left and right battery homes 905, recesses 910 to aid user removal of the batteries, indicator lights 1015, receptacles 1010, and charging points 1005. The battery homes may be, at least in part, below the surface 930. The inside surface 915 of the lid is raised to accommodate any space occupied by the removable batteries when inserted.

The bottom lid 125 opens from a side opposite the top lid 120. This configuration can ensure that a user can, for example, quickly identify which lid opens the earbuds home and which side opens the removable battery home. In addition, the user can use insignia (e.g., logo) or other markings on the charging case 105 as a reference point for the earbuds or batteries. For example, the user can remember that the bottom lid for the removable batteries opens from the charging port 305. Alternatively, a logo or other insignia can be used on the front or rear side of the case to indicate which lid is for the earbuds or removable batteries.

The female receptacles 1010 receive corresponding male connectors on the batteries 710. As shown in FIG. 10, each pair of receptacles are comprised of a different size or shape so that the user inserts the batteries the correct way and prevents a circuit shortage. For example, for the left battery home 905, the left receptacle is larger than the right receptacle. For the right battery home, the right receptacle is larger than the left receptacle. The receptacles on the charging case may be formfitting to the battery's male connectors so that the batteries rest easily into the case. The batteries' male connectors are utilized to fasten the battery to the earbud securely; however, for the charging case, the receptacles are used to hold the battery in place instead of locking the battery in place. Thus, the receptacles in the case may be, for example, a friction fit to the connectors to provide some securing to the batteries while in place.

Each battery home 905 includes a pair of charging points located in an upper region and lower region of the homes. Corresponding charging points on the removable batteries may engage with the case's charging points to receive a charge from the charging case 105. The charging points engage when the batteries' connectors are fully inserted into the receptacles 1010.

Like the earbud homes 410, the battery homes 905 may include a magnet that attracts a corresponding magnet on the earbud batteries 705 and makes insertion easier. Magnets may be positioned within receptacles 1010 or on their surrounding walls. A corresponding magnet may be placed on or around the removable batteries' connectors to provide an easy connection.

Figure 11:
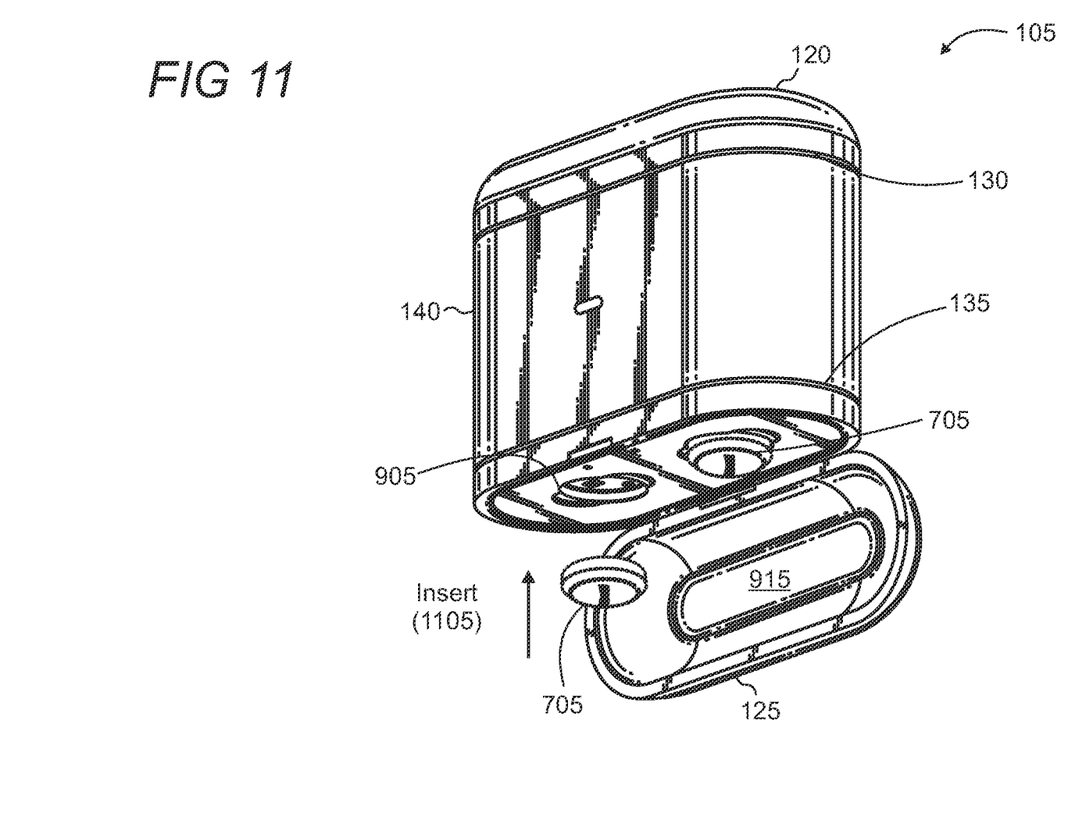
FIG. 11 shows an illustrative representation in which the earbud's interchangeable and rechargeable batteries are inserted into the battery homes.

FIG. 11 shows an illustrative representation in which removable batteries 705 are inserted into the battery homes 905, as representatively shown by numeral 1105. The removable batteries shown may have been detached from the earbud's main body 715 (FIG. 7). The current system's removable battery functionality enables users to virtually endlessly listen to music or other media on their earbuds with little to no interruption. The user can switch out the first pair of batteries, depleted or near depletion, in the earbuds with a charged pair of batteries from the charging case. Then, the user can insert the depleted batteries into the battery homes underneath the bottom lid so that those batteries can begin charging from case 105. The user can continue listening to music using the charged pair of batteries while the depleted batteries charge.

The indicator lights 1015 may operate similarly to the indicator lights 415 for the earbud charging side of the case, and as discussed with respect to FIG. 5. That is, the indicator lights may shine a color, such as white when the batteries are correctly engaged with the charging points 1005, may be switched off when disconnected, and may shine red when a problem is detected, such as liquid or some interference between charging points.

When removable batteries 705 and earbuds 605 are inserted into respective homes within the charging case, the charging case may be configured to charge the earbuds first since users will likely want to use their fully charged earbuds instead of a backup pair of batteries. Such controls may be configured into instructions stored within the case's memory and executed by a processor or dedicated microcontroller, the components of which function according to the description discussed with respect to FIG. 15.

Figure 12:
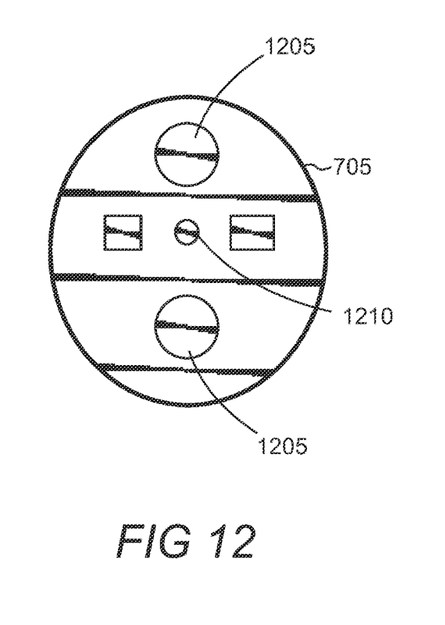
FIGS. 12-14 show illustrative representations of the earbud's battery from different vantage points.
Figure 13:
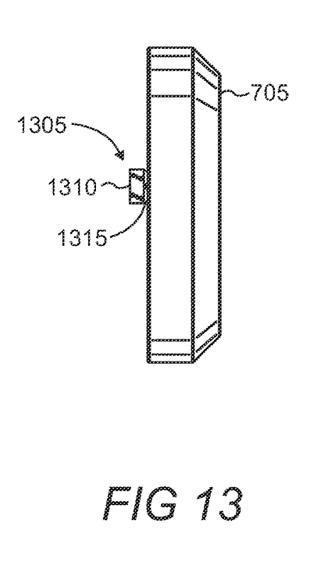
Figure 14:
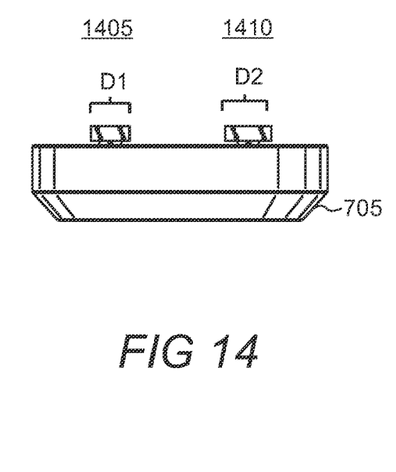

FIGS. 12-14 show illustrative representations in which the removable battery's structural components and configuration are detailed. The removable battery 705 includes differently shaped male connectors 1405, 1410, as shown by the different distances represented by D1 and D2 in FIG. 14. The differently shaped connectors ensure that the user places the battery in a correct orientation within the charging case 105 and therefore prevent shortages.

The connectors 1305 include a head 1310 and a neck 1315 to which the neck is attached. The removable battery 705 includes an upper and lower charging point 1205 that engage with the corresponding charging points 1005 in the battery homes 905. Sensor 1210 is used to relay information from the battery to the earbud's main body 715. The interoperability and configurations of the removable battery and earbud's main body can be viewed in corresponding U.S. patent application Ser. No. 17/305,474, filed Jul. 8, 2021, entitled "Interchangeable and Rechargeable Batteries for Earbuds," the entire contents of which is hereby incorporated herein by reference.

Figure 15:
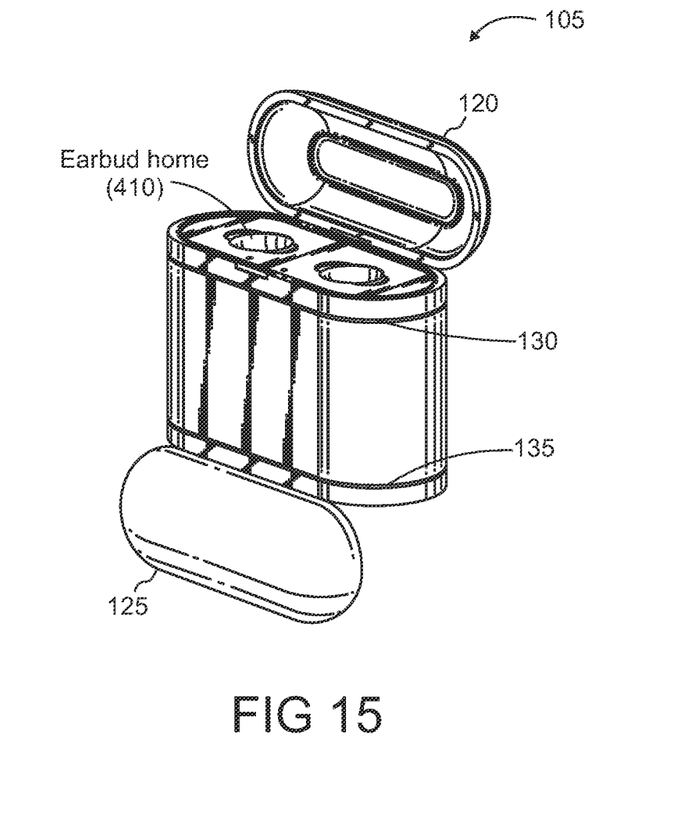
FIGS. 15 and 16 show illustrative representations of both of the case's lids propped open simultaneously.
Figure 16:
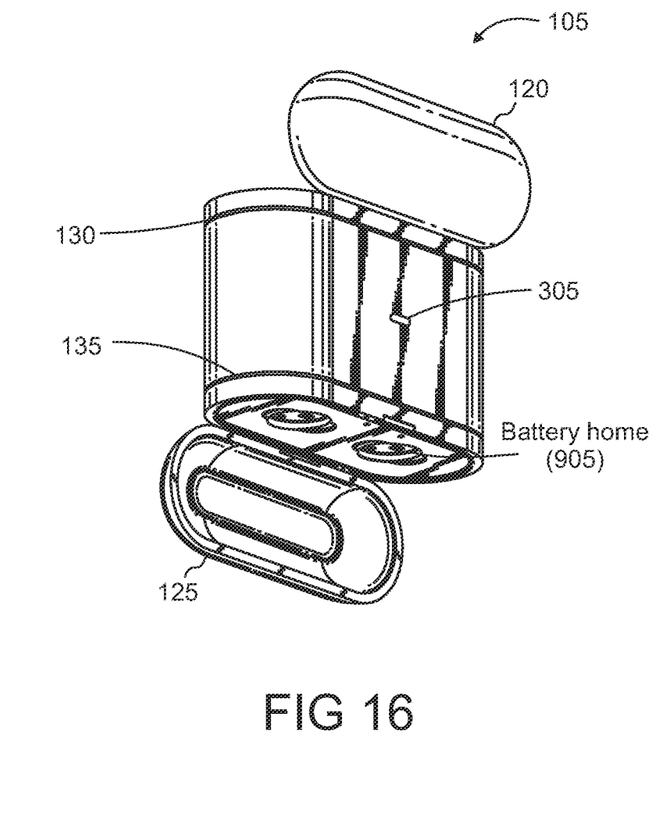

FIGS. 15 and 16 show illustrative representations in which the top lid 120 and bottom lid 125 can be simultaneously propped open about their respective hinges. Thus, the user can access and use both of the case's charging stations simultaneously, that is, the earbuds and removable battery charging stations.

Figure 17:
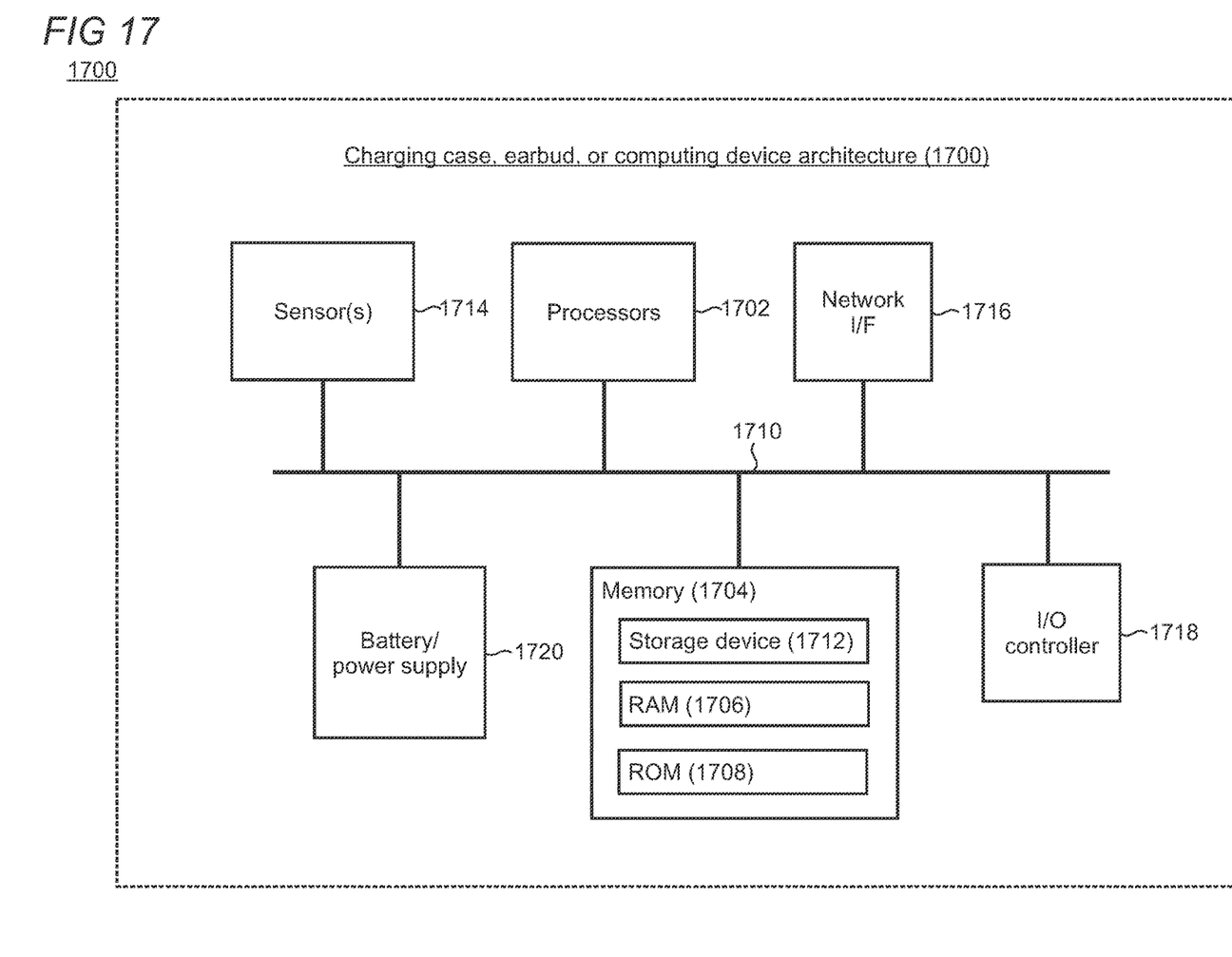
FIG. 17 shows an illustrative block diagram of a computing system, such as the earbud charging case or computer, that may be used to implement the present charging case.

FIG. 17 shows an illustrative architecture 1700 for a device, such as the charging case 105, a pair of earbuds, smartphone, tablet, laptop, or personal computer capable of executing the various functions described herein. In this regard, the diagram illustrates components internal to the charging case that can be utilized to execute the various features herein, such as detecting a charging status of the earbuds or batteries, outputting charging status LEDs or indicator lights, etc. Additionally, the diagram illustrates components utilized by the earbuds or a computing device, such as a smartphone, which transfers audio or other media to the earbuds.

The architecture 1700 illustrated in FIG. 17 includes one or more processors 1702 (e.g., central processing unit, dedicated AI chip, microcontroller, graphics processing unit, etc.), a system memory 1704, including RAM (random access memory) 1706, ROM (read-only memory) 1708, and long-term storage devices 1712. The system bus 1710 operatively and functionally couples the components in the architecture 1700. A basic input/output system containing the basic routines that help to transfer information between elements within the architecture 1700, such as during startup, is typically stored in the ROM 1708. The architecture 1700 further includes a long-term storage device 1712 for storing software code or other computer-executed code that is utilized to implement applications, the file system, and the operating system. The storage device 1712 is connected to processor 1702 through a storage controller (not shown) connected to bus 1710. The storage device 1712 and its associated computer-readable storage media provide non-volatile storage for the architecture 1700. Although the description of computer-readable storage media contained herein refers to a long-term storage device, such as a hard disk or CD-ROM drive, it may be appreciated by those skilled in the art that computer-readable storage media can be any available storage media that can be accessed by the architecture 1700, including solid-state drives and flash memory.

By way of example, and not limitation, computer-readable storage media may include volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read-only memory), EEPROM (electrically erasable programmable read-only memory), Flash memory or other solid-state memory technology, CD-ROM, DVDs, HD-DVD (High Definition DVD), Blu-ray, or other optical storage, magnetic cassettes, magnetic tape, magnetic disk storage or other magnetic storage devices, or any other medium which can be used to store the desired information and which can be accessed by the architecture 1700.

According to various embodiments, the architecture 1700 may operate in a networked environment using logical connections to remote computers through a network. The architecture 1700 may connect to the network through a network interface unit 1716 connected to the bus 1710. It may be appreciated that the network interface unit 1716 also may be utilized to connect to other types of networks and remote computer systems. The architecture 1700 also may include an input/output controller 1718 for receiving and processing input from a number of other devices, including a keyboard, mouse, touchpad, touch-screen, control devices such as buttons and switches or electronic stylus (not shown in FIG. 17). Similarly, the input/output controller 1718 may provide output to a display screen, user interface, a printer, or other type of output device (also not shown in FIG. 17).

It may be appreciated that any software components described herein may, when loaded into the processor 1702 and executed, transform the processor 1702 and the overall architecture 1700 from a general-purpose computing system into a special-purpose computing system customized to facilitate the functionality presented herein. The processor 1702 may be constructed from any number of transistors or other discrete circuit elements, which may individually or collectively assume any number of states. More specifically, processor 1702 may operate as a finite-state machine in response to executable instructions contained within the software modules disclosed herein. These computer-executable instructions may transform the processor 1702 by specifying how the processor 1702 transitions between states, thereby transforming the transistors or other discrete hardware elements constituting the processor 1702.

Encoding the software modules presented herein also may transform the physical structure of the computer-readable storage media presented herein. The specific transformation of physical structure may depend on various factors in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

The computing device's sensors 1714 may include any number of sensors, including a battery life sensor which detects a connecton with the earbuds or battery and which detect a battery life of the respective component. This information may be transmitted to the processor which responsively controls the charging status and indicator lights. The battery supply 1720 may be a rechargeable lithium-ion (Li-ion) so that the case can receive and store a charge, and pass that charge via the charging points to a connected pair of earbuds and removable batteries.

Various exemplary embodiments are disclosed herein. In one exemplary embodiment, disclosed is an earbuds charging case, comprising: a central body having a top lid and a bottom lid which open and close; a left earbud home and a right earbud home positioned underneath the top lid and adapted to receive earbuds, the left and right earbud homes having a charging point which engages with a corresponding charging point the earbuds, respectively, the left and right earbud homes being below a flat surface on the central body underneath the lid; and an upper charging status light that extends around an exterior perimeter from a front side to a rear side of the central body, in which an output light of the upper charging status light changes based on a detected battery life of inserted earbuds into the left and right earbud homes.

As another example, the upper charging status light extends around an entire perimeter of the central body such that the upper charging status light is unbroken from end to end. In another example, the upper charging status light is separated into sections, in which one lateral side is dedicated to outputting a status light responsive to a detected battery life for a left earbud, and an opposing lateral side is dedicated to outputting a status light responsive to a detected battery life for the right earbud. As a further example, an interior surface of the top lid is recessed to accommodate space occupied by the inserted earbuds. In another example, further comprising a left battery home and a right battery home underneath the bottom lid and adapted to receive detachable earbud batteries. As another example, the left and right battery homes have a different structure than the left and right earbud homes. In another example, further comprising a lower charging status light that extends around an exterior perimeter from the front side to the rear side of the central body, in which an output light of the lower charging status light changes based on a detected battery life of inserted detachable earbud batteries into the left and right battery homes. As another example, the lower charging status light extends around the entire perimeter of the central body such that the lower charging status light is unbroken from end to end. In another example, further comprising a battery life sensor internal to the earbud's central body for detecting a battery life of the inserted earbuds and detachable earbud batteries.

In another exemplary embodiment, disclosed is an earbuds charging case, comprising: a central body having a top lid and a bottom lid which open and close; a left battery home and a right battery home positioned underneath the bottom lid and adapted to receive detachable earbud batteries, the left and right battery homes having a charging point which engages with a corresponding charging point on the detachable earbud batteries; and a lower charging status light that extends around an exterior perimeter from a front side to a rear side of the central body, in which an output light of the lower charging status light changes based on a detected battery life of inserted earbuds into the left and right battery homes.

As another example, further comprising a battery life sensor internal to the earbud's central body for detecting a battery life of the inserted detachable earbud batteries. In another example, the top lid and the bottom lid open from opposite sides of the central body, such that respective hinges for the top and bottom lid are on opposite sides of each other. In another example, the lower charging status light extends around an entire perimeter of the central body such that the lower charging status light is unbroken from end to end. As a further example, the lower charging status light is separated into sections, in which one lateral side is dedicated to outputting a status light responsive to a detected battery life for a left detachable earbud battery, and an opposing lateral side is dedicated to outputting a status light responsive to a detected battery life for the right detachable earbud battery. As another example, an interior surface of the top lid is recessed to accommodate space occupied by the inserted earbuds. As a further example, further comprising a left earbud home and a right earbud home underneath the top lid and adapted to receive earbuds. As another example, the left and right battery homes have a different structure than the left and right earbud homes. In another example, further comprising a pair of receptacles within the left and right battery homes, in which individual receptacles on each pair are differently sized and shaped to ensure correct battery orientation when inserted. As a further example, further comprising indicator lights on a surface adjacent to the left and right battery homes, in which the indicator lights output a characteristic about each battery's connection to the left and right battery homes. As another example, the indicator lights output a specific color responsive to interference detected between the battery homes' charging points and the detachable earbud batteries' charging points.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. An earbuds charging case, comprising:
   a central body having a top lid and a bottom lid which open and close;
   a left earbud home and a right earbud home positioned underneath the top lid and adapted to receive earbuds, the left and right earbud homes having a charging point which engages with a corresponding charging point on the earbuds, respectively, the left and right earbud homes being below a flat surface on the central body underneath the lid; and
   an upper charging status light that extends around an exterior perimeter from a front side to a rear side of the central body, in which an output light of the upper charging status light changes based on a detected battery life of inserted earbuds into the left and right earbud homes.

2. The earbuds charging case of claim 1, wherein the upper charging status light extends around an entire perimeter of the central body such that the upper charging status light is unbroken from end to end.

3. The earbuds charging case of claim 2, wherein the upper charging status light is separated into sections, in which one lateral side is dedicated to outputting a status light responsive to a detected battery life for a left earbud, and an opposing lateral side is dedicated to outputting a status light responsive to a detected battery life for the right earbud.

4. The earbuds charging case of claim 3, wherein an interior surface of the top lid is recessed to accommodate space occupied by the inserted earbuds.

5. The earbuds charging case of claim 4, further comprising a left battery home and a right battery home underneath the bottom lid and adapted to receive detachable earbud batteries.

6. The earbuds charging case of claim 5, wherein the left and right battery homes have a different structure than the left and right earbud homes.

7. The earbuds charging case of claim 6, further comprising a lower charging status light that extends around an exterior perimeter from the front side to the rear side of the central body, in which an output light of the lower charging status light changes based on a detected battery life of inserted detachable earbud batteries into the left and right battery homes.

8. The earbuds charging case of claim 7, wherein the lower charging status light extends around the entire perimeter of the central body such that the lower charging status light is unbroken from end to end.

9. The earbuds charging case of claim 8, further comprising a battery life sensor internal to the earbud's central body for detecting a battery life of the inserted earbuds and detachable earbud batteries.

10. An earbuds charging case, comprising:
- a central body having a top lid and a bottom lid which open and close;
- a left battery home and a right battery home positioned underneath the bottom lid and adapted to receive detachable earbud batteries, the left and right battery homes having a charging point which engages with a corresponding charging point on the detachable earbud batteries; and
- a lower charging status light that extends around an exterior perimeter from a front side to a rear side of the central body, in which an output light of the lower charging status light changes based on a detected battery life of inserted earbuds into the left and right battery homes.

11. The earbuds charging case of claim 10, further comprising a battery life sensor internal to the earbud's central body for detecting a battery life of the inserted detachable earbud batteries.

12. The earbuds charging case of claim 10, wherein the top lid and the bottom lid open from opposite sides of the central body, such that respective hinges for the top and bottom lid are on opposite sides of each other.

13. The earbuds charging case of claim 10, wherein the lower charging status light extends around an entire perimeter of the central body such that the lower charging status light is unbroken from end to end.

14. The earbuds charging case of claim 13, wherein the lower charging status light is separated into sections, in which one lateral side is dedicated to outputting a status light responsive to a detected battery life for a left detachable earbud battery, and an opposing lateral side is dedicated to outputting a status light responsive to a detected battery life for the right detachable earbud battery.

15. The earbuds charging case of claim 14, wherein an interior surface of the top lid is recessed to accommodate space occupied by the inserted earbuds.

16. The earbuds charging case of claim 15, further comprising a left earbud home and a right earbud home underneath the top lid and adapted to receive earbuds.

17. The earbuds charging case of claim 16, wherein the left and right battery homes have a different structure than the left and right earbud homes.

18. The earbuds charging case of claim 10, further comprising a pair of receptacles within the left and right battery homes, in which individual receptacles on each pair are differently sized and shaped to ensure correct battery orientation when inserted.

19. The earbuds charging case of claim 10, further comprising indicator lights on a surface adjacent to the left and right battery homes, in which the indicator lights output a characteristic about each battery's connection to the left and right battery homes.

20. The earbuds charging case of claim 19, wherein the indicator lights output a specific color responsive to interference detected between the battery homes' charging points and the detachable earbud batteries' charging points.

\* \* \* \* \*